United States Patent
Zhang et al.

(10) Patent No.: US 6,356,027 B1
(45) Date of Patent: Mar. 12, 2002

(54) 0-10V DIMMING INTERFACE PROTECTION CIRCUIT

(75) Inventors: Michael Y. Zhang, Chicago; Adan Hernandez; Sreeraman Venkitasubrahmanian, both of Naperville, all of IL (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/306,910

(22) Filed: May 7, 1999

(51) Int. Cl.[7] .............................................. H05B 37/00
(52) U.S. Cl. ........................ 315/136; 315/240; 315/362
(58) Field of Search ...................... 315/DIG. 4, DIG. 5, 315/136, 240, 362, 225

(56) References Cited

U.S. PATENT DOCUMENTS 4,282,462 A * 8/1981 Peil et al. ...................... 315/46

FOREIGN PATENT DOCUMENTS

GB          2160721 A       12/1985

* cited by examiner

*Primary Examiner*—David Vu
(74) *Attorney, Agent, or Firm*—Bernard Franzblau

(57) ABSTRACT

A 0–10V dimming interface protection circuit generating an indication that line voltage is applied across first and second leads of the dimming interface controlling light output by a lamp, includes a first device for limiting current serially connected between a line voltage source and the first lead of the dimming interface, a second device connected across the first and second leads for detecting application of line voltage to the dimming interface and for generating a control signal, and a third device for switching, operated in response to the control signal, for causing an increase in resistance of the first device to thereby limit current to the dimmer interface and limit light output by the lamp. According to one aspect of the invention, the protection circuit also includes a fourth device for preventing spurious operation of the second device.

28 Claims, 2 Drawing Sheets

# 0-10V DIMMING INTERFACE PROTECTION CIRCUIT

BACKGROUND OF THE INVENTION

The present invention relates generally to a protection circuit more specifically, the present invention relates to a 0–10V interface protection circuit.

As illustrated in FIG. 1, the output of many ballast-driven lighting systems can be controlled by employing an industry standard 0–10V dimmer. During the installation of 0–10V dimming ballasts, one of the commonly made mistakes is that the dimming input wires, together with the line input wires, are connected to the mains, which predictably results in damage to the dimming interface circuit inside the ballast. A protection circuit which protects the dimming interface circuit from being damaged when the dimming wires are wrongly connected is known. However, the known protective circuit sets the ballast at fill light output. Thus, although the interface circuit is protected from excess current/power, the user is not alerted to the fact that the system has been incorrectly wired.

Thus, when the dimming input wires, together with the line input wires, are connected to the mains, fill light output does not provide enough warning of the incorrect wiring. What is needed is a device which clamps the ballast at the lowest light output level when the dimming wires and the line input wires are incorrectly connected to the mains to thereby provide a positive indication of incorrect wiring. What is also needed is a protective circuit which provides the above-described protective function at low cost. It would be beneficial if the postulated protective circuit would include one or more current limiting elements.

SUMMARY OF THE INVENTION

Based on the above and foregoing, it can be appreciated that there presently exists a need in the art for a 0–10V dimming interface protection circuit which overcomes the above-described deficiencies. The present invention was motivated by a desire to overcome the drawbacks and shortcomings of the presently available technology, and thereby fulfill this need in the art.

One object of the present invention is to provide a dimming interface protective circuit which clamps the ballast at the lowest light output level when the dimming wires and the line input wires are incorrectly connected to the mains voltage to thereby provide a positive indication of incorrect wiring.

Another object according to the present invention is to produce a dimming interface protective circuit which provides the above-described protective function at a low cost.

Still another object according to the present invention is to provide a dimming interface protective circuit which provides the above-described protective function at a low cost by utilizing one or more current limiting elements.

These and other objects, features and advantages according to the present invention are provided by a circuit protecting a low voltage component from application of high voltages. Advantageously, the circuit includes a positive temperature coefficient (PTC) thermistor connected to one lead of the low voltage component, a voltage detector which detects application of the high voltages to the low voltage component and generates a control signal, and a switch operated responsive to the control signal. According to an aspect of the present invention, operation of the switch increases resistance of the PTC thermistor to thereby limit current to the low voltage component.

These and other objects, features and advantages according to the present invention are provided by a 0–10V dimming interface protection circuit generating an indication that line voltage is applied across first and second leads of the dimming interface by controlling the light output of a lamp. Preferably, the protection circuit includes a positive temperature coefficient (PTC) thermistor serially connected between a line voltage source and the first lead of the dimming interface, a voltage detector connected across the first and second leads to detect application of line voltage to the dimming interface and to generate a control signal, and a switch operated responsive to the control signal, where operation of the switch increases resistance of the PTC thermistor to thereby limit current to the dimmer interface and limit light output by the lamp.

These and other objects, features and advantages according to the present invention are provided by a 0–10V dimming interface protection circuit generating an indication that line voltage is applied across first and second leads of the dimming interface by controlling the light output of a lamp, including a first device for limiting current serially connected between a line voltage source and the first lead of the dimming interface, a second device connected across the first and second leads for detecting the application of line voltage to the dimming interface and for generating a control signal, and a third device for switching, operated in response to the control signal, for causing an increase in resistance of the first device to thereby limit current to the dimmer interface and limit light output by the lamp. According to one aspect of the invention, the protection circuit also includes a fourth device for preventing spurious operation of the second device.

BRIEF DESCRIPTION OF THE DRAWINGS

These and various other features and aspects of the present invention will be readily understood with reference to the following detailed description taken in conjunction with the accompanying drawings, in which like or similar reference labels are used throughout, and in which.

DETAILED DESCRIPTION OF THE PREFERRED EMBODIMENTS

Figure 1:
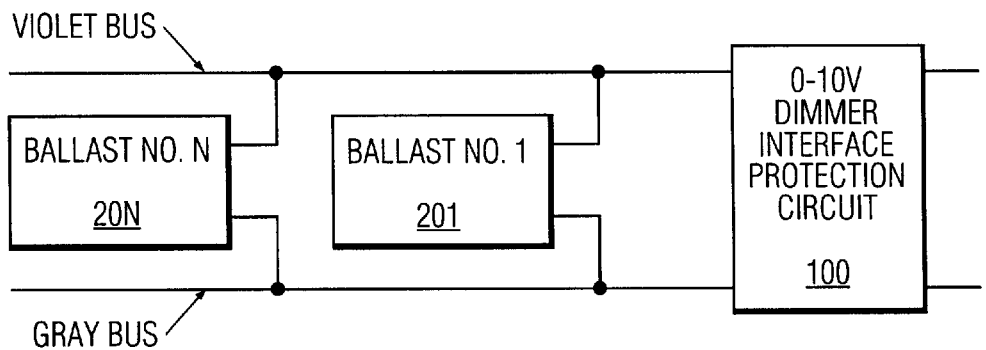
FIG. 1 is a functional block diagram of a conventional lighting system which includes a plurality of ballasts controlled by a 0–10V dimmer.
Figure 2:
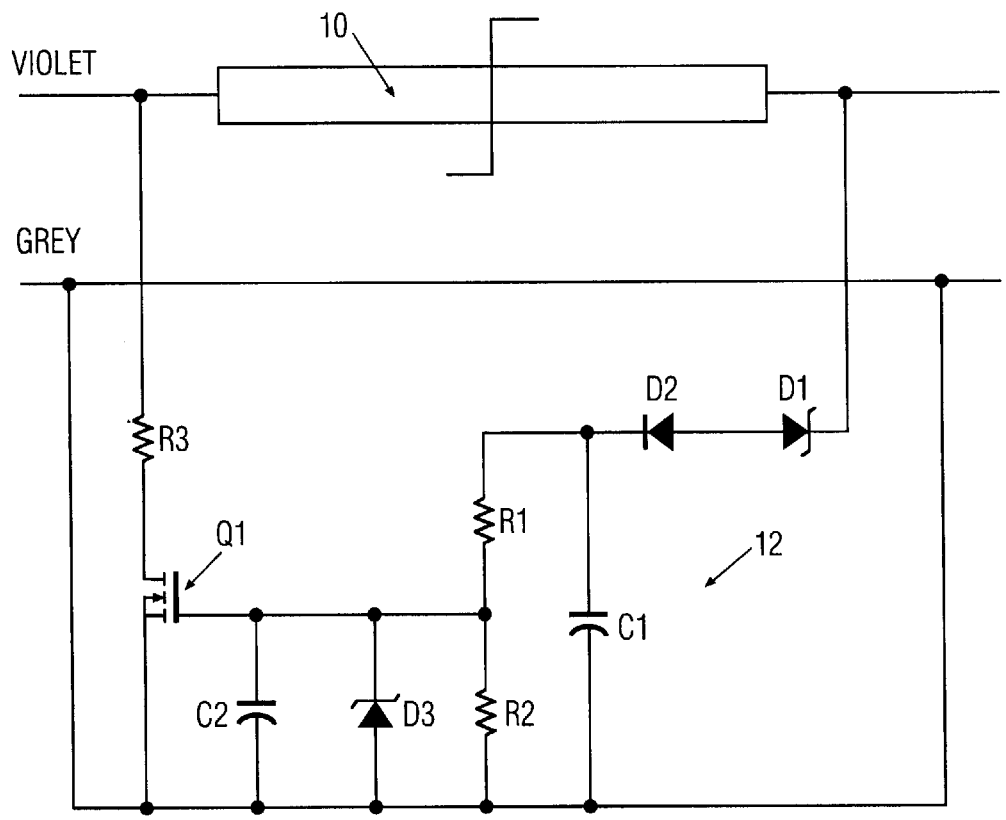
FIG. 2 illustrates a first preferred embodiment of a 0–10V dimmer interface circuit according to the present invention.

FIG. 2 illustrates a first preferred embodiment of a 0–10V dimmer interface protection circuit according to the present invention, which includes a current limiting device, a peak voltage detector, and a switch for causing the current limiting device to operate. Moreover, the 0–10V dimmer interface protection circuit advantageously may include a device to prevent spurious operation of the protection circuitry.

As illustrated in FIG. 2, a current limiting device 10, which in an exemplary case advantageously can be a positive temperature coefficient (PTC) thermistor, is installed in one lead, i.e., the Violet lead between the Violet bus and the 0–10V dimmer. It will be appreciated that a thermistor is a thermally sensitive resistor, i.e., a device whose resistance changes significantly and predictably with temperature. The resistance of a PTC thermistor increases as temperature increases. This increase in resistance advantageously is so abrupt and predictable that the PTC thermistor can function as an electronic switch. It will also be appreciated that the increase in resistance advantageously may be a several orders of magnitude increase.

Still referring to FIG. 2, the protection circuit, in addition to the current limiting device 10, includes a switch Q1, which preferably can be a transistor switch and which most preferably can be a MOSFET transistor, operated by a voltage detector 12. In an exemplary case, the voltage detector 12 can be constructed from series connected diode D2 and capacitor C1. It will be appreciated that the zener diode D1 prevents operation of the protection circuit according to the present invention due to spurious voltage transients.

From inspection of FIG. 2, it will be appreciated that the switch Q1 advantageously can be turned on when the common node of the voltage divider formed from resistors R1 and R2 is above the gate operating voltage. The diode D3 insures that the voltage applied to the gate is within the operating voltage. Capacitor C2 filters the noise applied to the gate of switch Q1; moreover, the time constant dictated by the RC circuit C2—R2 advantageously controls the rate of operation of switch Q1.

It should be mentioned that the PTC thermistor is selected such that at a low voltage condition, e.g., less than 20V across the PTC thermistor, the element 10 advantageously will remain at a low resistance, e.g., approximately 1K Ohms ($\Omega$). However, when there is a high voltage across element 10, e.g., 120 Vrms or 277 Vrms, a high current will result in a dramatic increase in the resistance, e.g., the resistance will increase to 100 K$\Omega$, which thereby limits the current through both the current limiter 10 and, ultimately, the 010–10V dimming interface. It should also be mentioned that the nominal voltage for the D1 zener diode advantageously can be in the range of 50V to 180V for 277V applications, and in the range of 50V to 80V for 120V applications.

During the normal operation, a low DC voltage (0–10V) will be applied across the Violet and Grey wires, i.e., be applied to the 0–10V dimming interface. In that case, the PTC thermistor 10 will remain in a low resistance state, due to the low current. The zener diode D1 will prevent the peak voltage detector from activating and, thus, the switch Q1, e.g., the MOSFET transistor will remain off.

In contrast, when the dimming input Violet and Grey wires are connected to the mains, i.e., to a 120V or 277V source, instead of a low voltage source, the peak detection circuit (D2 and C1) will detect the peak voltage of the mains and turn MOSFET Q1 on. Since R3 is a low value resistor, e.g., approximately 10 ohms, the Violet and Grey leads are effectively shorted, which will force the ballasts 201, 20N into the lowest dimming level. Meanwhile, turning on the switch Q1 results in application of the over voltage across both PTC thermistor 10 and resistor R3. Since the value of the resistor R3 is much less than the steady state resistance value of PTC thermistor 10, e.g., 25–100$\Omega$, the majority of the voltage will be dissipated across the PTC thermistor 10. It will be appreciated that this results in a high current through PTC thermistor 10, which high current will increase the temperature of the PTC thermistor, which, in turn, will increase the resistance of PTC thermistor 10 dramatically, as mentioned above. Therefore, the PTC thermistor 10 operates to limit the current applied to the ballasts 201, 20N at the respective dimmer interfaces.

Figure 3:
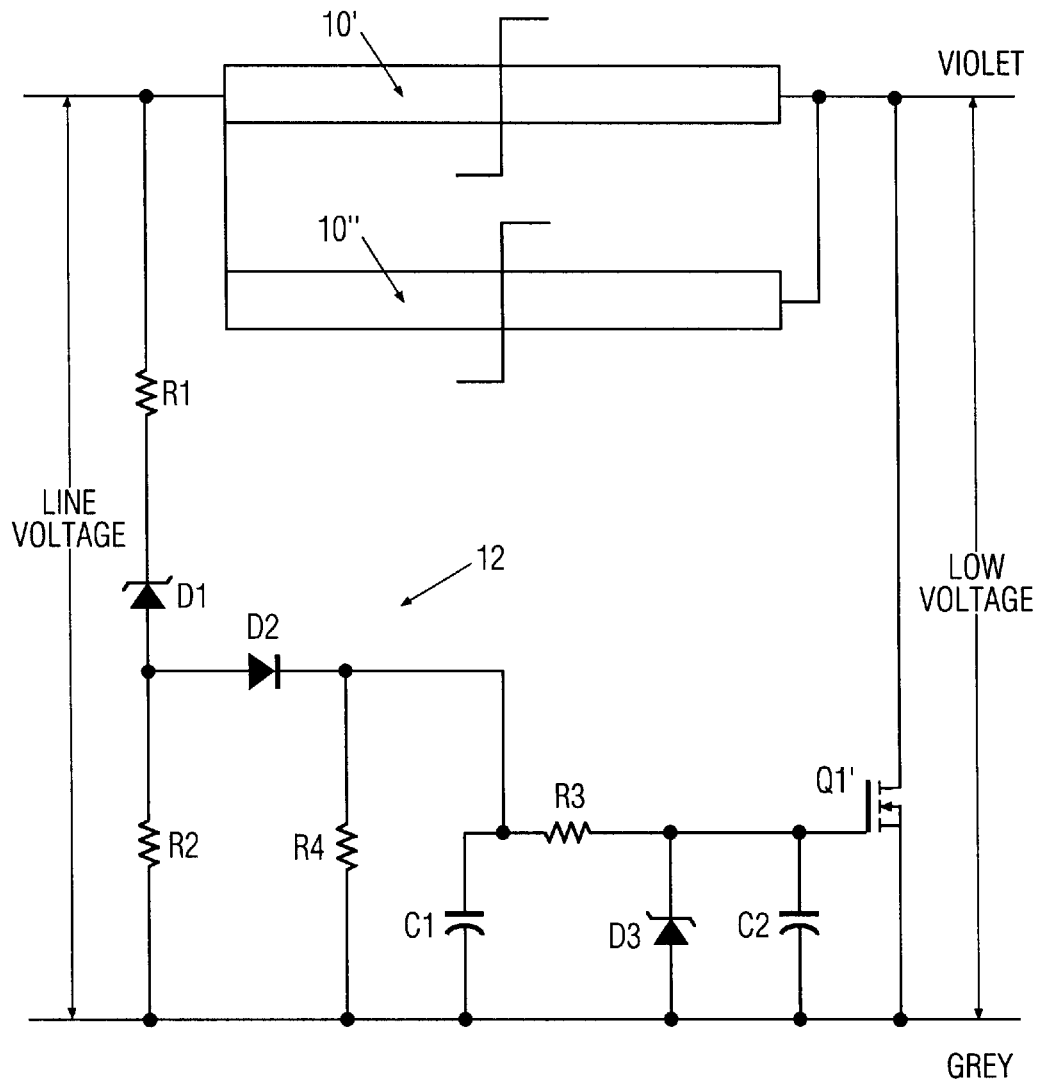
FIG. 3 illustrates a second preferred embodiment of a 0–10V dimmer interface circuit according to the present invention.

FIG. 3 illustrates a second preferred embodiment of the protection circuit according to the present invention, which advantageously includes parallel PTC thermistors 10' and 10". In this exemplary configuration, resistors R1, R2 and the zener diode D1, which are disposed across the mains, prevent the protection circuit from operating responsive to voltage spikes and other line transients. The voltage detector 12 advantageously includes diode D2 and capacitor C1, with resistor R4 providing a discharge path for capacitor C1. The zener diode D3 insures that the detected voltage is greater than the gate operating voltage of switch Q1', while resistor R3 and capacitor C2 determine the switching time of switch Q1'. It will be appreciated that during an over voltage condition, i.e., when the 0–10V dimmer interface is connected to the mains, closure of switch Q1' will result in high current through PTC thermistor 10' and 10", which will result in an increase in current through elements 10' and 10" and, ultimately, initiation of a current limiting function.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A circuit for protecting a low voltage component from application of high voltages, comprising:
    a positive temperature coefficient (PTC) thermistor connected to one lead of the low voltage component;
    a voltage detector which detects application of the high voltages to the low voltage component and generates a control signal; and
    a switch operated responsive to the control signal;
    wherein operation of the switch increases resistance of the PTC thermistor to thereby limit current to the low voltage component.

2. The circuit as recited in claim 1, further comprising a zener diode serially coupling the voltage detector to an input lead of the circuit in a manner to prevent spurious operation of the voltage detector.

3. The circuit as recited in claim 1, wherein the switch comprises a transistor.

4. The circuit as recited in claim 3, wherein the transistor is a MOSFET transistor.

5. The circuit as recited in claim 1, wherein the PTC thermistor comprises parallel connected first and second PTC thermistors.

6. A 0–10V dimming interface protection circuit generating an indication that line voltage is applied across first and second leads of a dimming interface which controls the light output of a lamp; comprising:
    a positive temperature coefficient (PTC) thermistor serially connected in the first lead of the dimming interface;
    a voltage detector connected across the first and second leads to detect application of line voltage to the dimming interface and to generate a control signal; and
    a switch operated responsive to the control signal;
    wherein operation of the switch increases resistance of the PTC thermistor to thereby limit current to the dimmer interface and limit light output by the lamp.

7. The 0–10V dimming interface protection circuit as recited in claim 6, further comprising a zener diode serially coupling the voltage detector to the first lead to by prevent spurious operation of the voltage detector.

8. The 0–10V dimming interface protection circuit as recited in claim 6, wherein the switch comprises a transistor.

9. The 0–10V dimming interface protection circuit as recited in claim 8 wherein the transistor is a MOSFET transistor.

10. The 0–10V dimming interface protection circuit as recited in claim 6, wherein the PTC thermistor comprises parallel connected first and second PTC thermistors.

11. The 0–10V dimming interface protection circuit as recited in claim 6, wherein the switch and PTC thermistor together operate to clamp the voltage across the first and second leads to a very low level such that the indication is low light output from the lamp when line voltage is applied across the first and second leads.

12. The 0–10V dimming interface protection circuit as recited in claim 6, wherein application of line voltage comprises permanent application of line voltage.

13. A 0–10V dimming interface protection circuit generating an indication that line voltage is applied across first and second leads of a dimming interface which controls the light output of a lamp; comprising:
    means for limiting current serially connected between a line voltage source and the first lead of the dimming interface;
    means connected across the first and second leads for detecting application of line voltage to the dimming interface and for generating a control signal; and
    means for switching operated responsive to the control signal, the switching means causing an increase in resistance of the current limiting means to thereby limit current to the dimmer interface and limit light output by the lamp.

14. The 0–10V dimming interface protection circuit as recited in claim 13, further comprising means for preventing spurious operation of the detecting means.

15. The 0–10V dimming interface protection circuit as recited in claim 13, wherein the switching means comprises a transistor.

16. The 0–10V dimming interface protection circuit as recited in claim 15, wherein the transistor is a MOSFET transistor.

17. The 0–10V dimming interface protection circuit as recited in claim 13, wherein the current limiting means comprises a PTC thermistor.

18. The 0–10V dimming interface protection circuit as recited in claim 17, wherein the PTC thermistor comprises parallel connected first and second PTC thermistors.

19. The 0–10V dimming interface protection circuit as recited in claim 13, wherein the indication is low light output from the lamp during operation.

20. The 0–10V dimming interface protection circuit as recited in claim 13, wherein application of line voltage comprises permanent application of line voltage.

21. The 0–10V dimming interface protection circuit as claimed in claim 13 wherein the voltage detecting means is connected to the line voltage side of the current limiting means and the switching means is connected to the first lead of the dimming interface.

22. The 0–10V dimming interface protection circuit as claimed in claim 13 further comprising a voltage breakdown element coupling the voltage detecting means to the line voltage side of the current limiting means thereby to inhibit operation of the interface protection circuit on transient voltages.

23. The 0–10V dimming interface protection circuit as claimed in claim 22 wherein the current limiting means comprises a PTC thermistor, the voltage breakdown element comprises a zener diode, the voltage detecting means comprises a diode and a capacitor, and the lamp comprises an electric discharge lamp.

24. The 0–10V dimming interface protection circuit as claimed in claim 13 wherein the current limiting means comprises a PTC thermistor, the PCT thermistor and the switching means being connected in series circuit to the line voltage source and with the switching means connected across the first and second leads of the dimming interface.

25. The 0–10V dimming interface protection circuit as claimed in claim 17 wherein the second lead is connected to the line voltage source, the voltage detecting means is connected to the second lead and to the line voltage side of the current limiting means, and the switching means is coupled across the first and second leads, all in a manner such that a heating current for the PTC thermistor can flow through the switching means when the switching means is turned on in response to said control signal.

26. The 0–10V dimming interface protection circuit as claimed in claim 6 wherein the voltage detector is connected to the input side of the PTC thermistor thereby to maintain the switch in a conductive state via said control signal so long as line voltage is applied across the first and second leads of the dimming interface.

27. The 0–10V dimming interface protection circuit as claimed in claim 8 further comprising an RC circuit coupled to the voltage detector and to a control electrode of the transistor switch so as to control the rate of operation of the transistor switch.

28. The 0–10V dimming interface protection circuit as claimed in claim 6 further comprising a zener diode coupling the voltage detector to the line voltage side of the PTC thermistor and to the second lead of the dimming interface.

* * * * *